July 31, 1956   M. J. CAMPANELLA   2,756,741
APPARATUS FOR OBTAINING SYSTOLIC INFORMATION
Filed April 29, 1954   3 Sheets-Sheet 1

INVENTOR.
MATTHEW J. CAMPANELLA
BY
ATTORNEY

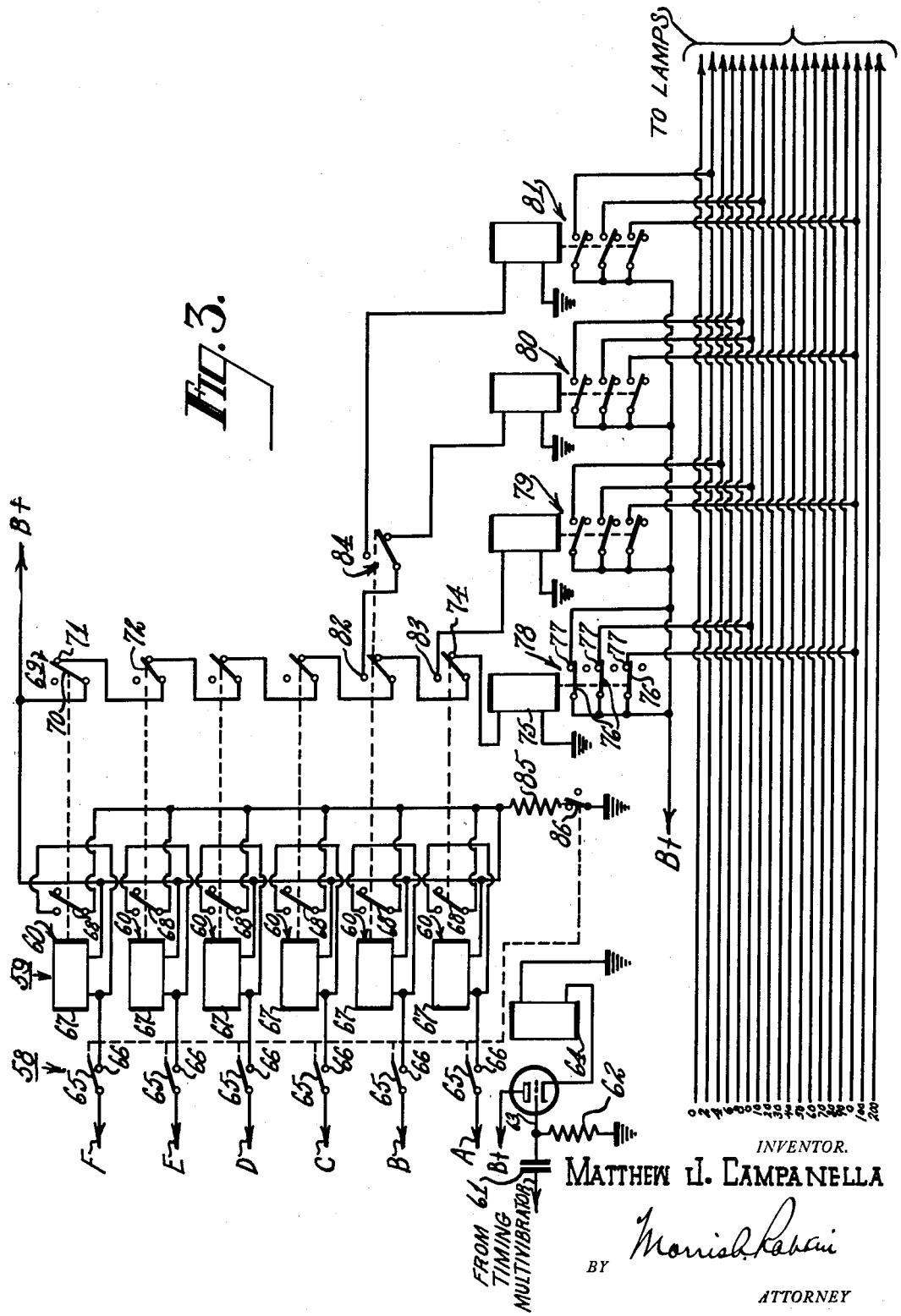

United States Patent Office 2,756,741
Patented July 31, 1956

2,756,741
APPARATUS FOR OBTAINING SYSTOLIC INFORMATION

Matthew J. Campanella, Hammonton, N. J., assignor to Radio Corporation of America, a corporation of Delaware Application April 29, 1954, Serial No. 426,508

10 Claims. (Cl. 128—2.05)

This invention relates to apparatus for obtaining medical information from the systolic pulsating action of a human or animal heart. In particular this invention relates to apparatus for the automatic and instantaneous display of blood pressure and heart beat information necessary during surgery.

It is of particular importance during surgical operations to obtain accurate and continuous information about condition of the heart. At present, the usual practice for the surgeon is to employ human assistants to take the patient's blood pressure and pulse count. However, an instantaneous warning is sometimes necessary to save the patient's life. The human assistant cannot keep a continuous check on blood pressure and pulse rate by the use of the presently available, manually operated equipment. An electronic device is proposed which will keep surveillance on the condition of the patient's heart automatically, and display necessary information so that it may be viewed by the surgeon.

To obtain an indication of the patient's blood pressure, it is necessary to analyze the heart beat impulse. The intensity of this impulse indicates blood pressure. The number of pulses per minute indicates the pulse count which is generally called the patient's pulse.

Previous methods of obtaining systolic heart beat information, involve obtaining a graph of the amplitude variations in the heart beat impulse as a function of time. This is done by strapping an inflated bag to the patient's person usually around the arm.

The fluctuations of the air pressure in the inflated bag are recorded by means of mechanical linkages. An alternate method of doing the same thing uses an electric pick-up and an oscillographic device. Automatic analysis of the graph for pulse and blood pressure requires a large amount of mechanism, all of which is subject to failure. In many applications the apparatus is not capable of portraying the instantaneous changes in heart condition.

According to the present invention heart beat impulses, commonly known as pulse beats, may be picked up at the wrist by an electrical pick-up that produces an output voltage proportional to the intensity of the impulses. These impulses which are now electrical signals may be amplified, and applied to an electronic comparator circuit which may be a difference amplifier circuit. The difference amplifier has an indicating device in its output circuit that is calibrated and adjusted to indicate the patient's blood pressure. The electrical signals from the pick-up apparatus are formed into sharp pulses of short duration and used to perform two functions. One of these is to trigger devices which provide a visual display of the pulse rhythm. This qualitatively shows the changes in the pulse. The other function is to provide a quantitative pulse count display.

Pulse counting apparatus is triggered by the formed, sharp pulses. The number of triggering pulses indicates the pulse count. Means are provided in association with the pulse counting apparatus to reset the counter after short periods of less than a minute. The displayed pulse count is consequently, indicative of any rapid changes.

A pulse count display matrix is used which includes an array of lamps in appropriate positions. The count is indicated by the arrangement of lamps which are glowing.

It is an object of this invention to provide an apparatus for obtaining systolic information.

It is a further object of this invention to provide apparatus for obtaining systolic information which is required during medical surgery continuosly and automatically.

It is a still further object of this invention to provide apparatus to give a continuous indication of the patient's blood pressure.

It is a still further object of this invention to provide apparatus to give an exact pulse count conforming to medical recommendations.

It is a still further object of this invention to provide apparatus for indicating a pulse count that is revised and changed so that a continuous quantitative indication of patient's pulse is available to the surgeon.

It is a still further object of this invention to provide a display apparatus for the patient's pulse count so that the pulse count that is displayed may be revised and changed.

It is a still further object of this invention to provide a pulse count display that is easily observable.

Other objects and advantages of the present invention will, of course, become apparent and immediately suggest themselves to those skilled in the art to which the invention is directed from a reading of the following specification in connection with the accompanying drawings in which:

Fig. 3 is a detailed schematic diagram showing the pulse count display matrix element of Fig. 1.

Figure 1:
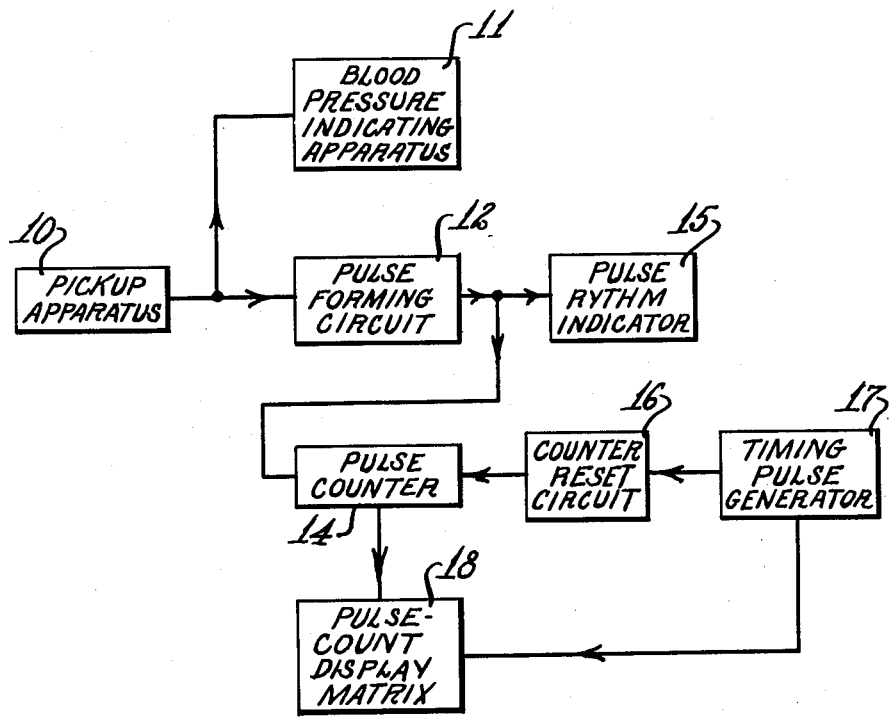
Fig. 1 is a block diagram of an illustrative embodiment of this invention.

In Fig. 1, the entire apparatus of an illustrative embodiment of this invention may be viewed. Arrows on the connections among elements indicate the path of the signals. Pick-up apparatus 10 may comprise an electro-mechanical transducer such as a carbon or crystal pick-up and associated amplifiers. The transducer is usually strapped to the wrist of the patient. The output of the pick-up apparatus 10 is an electrical signal that varies in amplitude in proportion to the blood pressure acting through an artery wall. Since the heart beats, that is pulsates, the flow of blood through the veins and arteries is necessarily pulsating. Therefore, the electrical signal picked up has a substantially pulse like waveform.

The signal output of the pick-up apparatus 10 divides. A blood pressure indicating apparatus 11 is the recipient of part of the signal. This apparatus contains an electronic comparator circuit which will be described in detail later. Briefly, it consists of a diode peak detector which provides a more slowly varying or practically D. C. signal.

Peak detection provides an indication of change from a normal signal level; that is, from a normal blood pressure. It is this change that is important to the operating surgeon. The peak detected signal is next connected to a difference amplifier, to be described later in detail, having an indicating meter connected in the plate circuit. This meter may be calibrated to show the normal as a center position. Any variation in blood pressure in any direction will appear on the meter and will be available for the surgeon's information.

Another part of the output signal from the pick-up apparatus 10 is connected to trigger a pulse forming circuit 12. One circuit preferred for the application is a monostable multivibrator. The design procedure for this type of multivibrator is well known, and it may easily be arranged to produce sharp voltage pulses of approximately one millisecond duration and to have a short recovery time. Pulses of approximately one millisecond duration are preferred since a pulse is generated by one triggering pulsation corresponding to a pulse beat, and the initial condition is restored before a second triggering pulsation arrives. The amplitude of the triggering pulsation necessary to trigger the pulse forming circuit 12 may be set by well known methods so that signals produced by random motion of the pick-up transducer will not trigger the multivibrator.

The voltage pulse produced by the pulse forming circuit 12 divides between the pulse rhythm indicator 15 and the pulse counter 14. The pulse rhythm indicator 15 may comprise an amplifier to raise the voltage pulse to a level of amplitude which will be sufficient to ignite a glow or neon lamp. The rate of which this lamp flashes will be a qualitative indication of the pulse rate. The surgeon's attention will be immediately drawn to the patient's condition by the flashing lamp.

The pulse counter 14 may be a binary counter that is made up of several bistable or flip-flop circuit stages. The leading stage is triggered. The combination of "on" tubes and "off" tubes in each stage is determined by the number of trigger pulses. A set of six bistable circuits is utilized in the illustrative example to be described later so that the counter can count to sixty-three without further multiplication.

Medical recommendation is to count the patient's pulse for fifteen second intervals. Therefore, a timing pulse generator 17 and a counter reset circuit pulse generator 16 are provided to reset the counter 14. The timing pulse generator may be an astable multivibrator producing a fifteen second "gate." A "gate" is the interval between two definite states of the astable multivibrator circuit during which certain events are allowed to occur. A discussion of "gates" and gating circuits may be found in the text, "Waveforms," Radiation Laboratory Series, vol. 19, page 364. This timing gate is preferably amplified and made to actuate a relay. The counter reset circuit 16 and the timing pulse generator 17 will be described in detail later. To explain the reset operation, it is only necessary at this time to point out that the reset relay has a set of contacts connected to the bistable counting stages. During the time a count is taken, these contacts are arranged to be in one position. On energization of the reset relay by the timing pulse corresponding to the end of the fifteen second gate, the contacts reverse momentarily. This restores the counter to an initial or zero position.

A pulse count display matrix 18 receives the information from the counter and illuminates an arrangement of lamps to indicate the count. Such lamps may be arranged in vertical columns corresponding to hundreds, tens, and digits so that there is an instantaneous display of the pulse count.

Since the counter is reset every fifteen seconds the count must be multiplified by four to give pulses counted per minute. This is done by the wiring arrangement in the lamp circuits as will be shown later. The pulse from the timing pulse generator 17 resets the display matrix 18 after the predetermined intervals of fifteen seconds.

In operation, the time sequence of events takes place as follows:

The pulse counter 14 is reset; a fifteen second interval passes in which a new count is received; a timing pulse from the timing pulse generator actuates a relay that resets the display matrix of lamps by turning all lamps off; and simultaneously, with the timing pulse still on, a set of contacts on the relay close and connect the counter to the pulse count display matrix 18. This registers the count and locks it in. The cycle then repeats. The details of the "lock-in" circuit and the display matrix wiring will be discussed later in connection with the detailed description of that unit.

*Blood pressure indicating apparatus*

Figure 2:
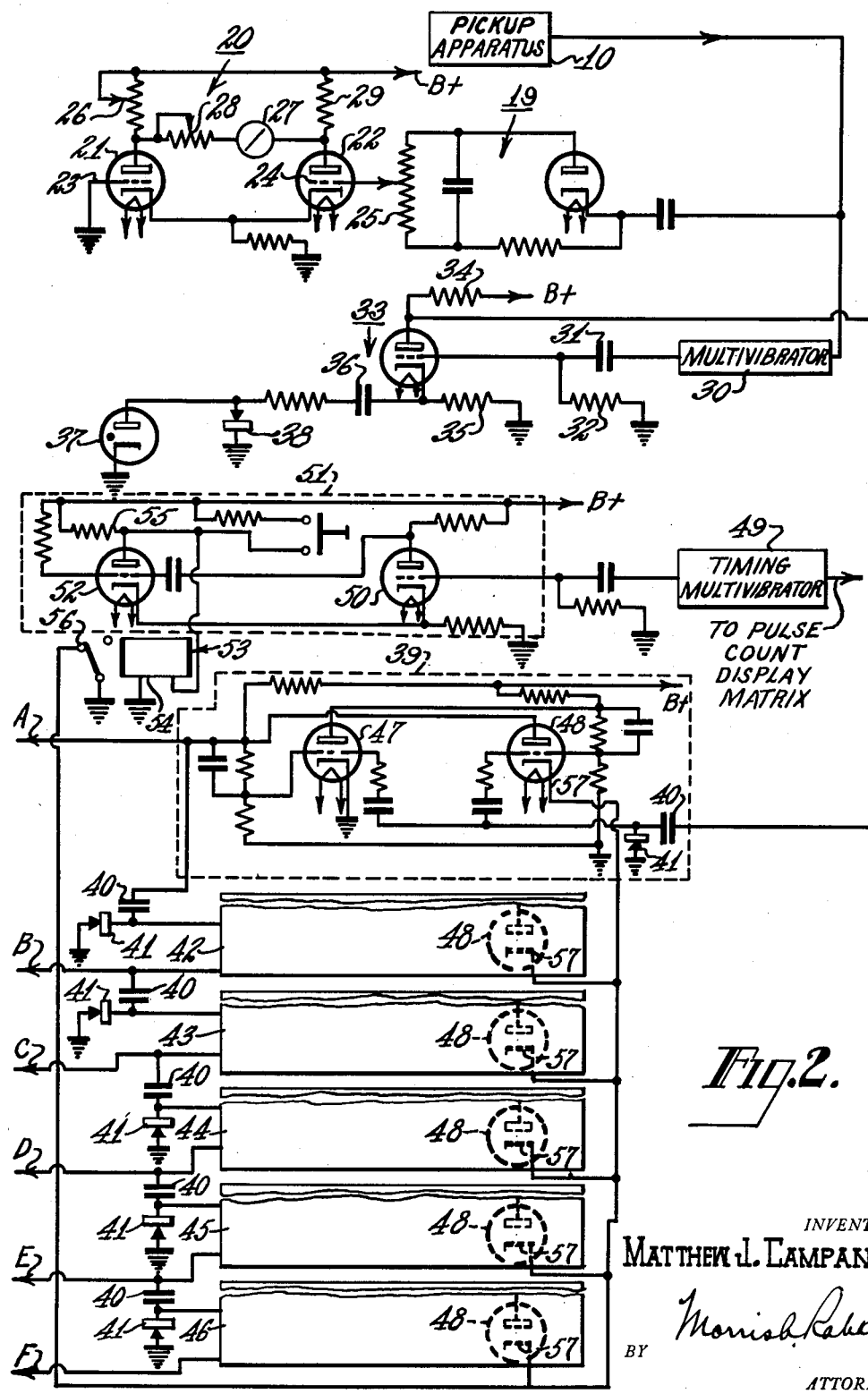
Fig. 2 is a schematic diagram showing, in greater detail, the apparatus illustrated in the embodiment of Fig. 1 with the exception of the pulse count display matrix.

In Fig. 2, the pick-up apparatus 10 is shown supplying signal to the peak detector portion 19 of the blood pressure indicating apparatus 11 (Fig. 1). A difference amplifier 20 incorporated in the blood pressure indicating apparatus 11 (Fig. 1) is shown by way of illustration. The difference amplifier 20 includes two tubes 21 and 22. The control grid 23 of one tube 21 is connected to a suitable reference level of potential, such as ground, as shown. The control grid 24 of the other tube 22 is connected to the output of a peak detector 19. A driving potential that may be varied by adjustment of a potentiometer 25 is applied to the control grid 24 from the peak detector 19. The plates of the tubes 21 and 22 are connected to a source of relatively high B+ potential (not shown) through plate resistors 26 and 29 one of which 26 is variable for purposes of adjustment. Connected between the plates is an indicating device 27 which is preferably a meter having a null or zero position at its center. A meter sensitivity adjusting potentiometer 28 is associated with the meter 27. It is known that the voltage between the plates of each tube in a difference amplifier will be proportional to the difference between the driving voltages applied to the grids. Consequently, the meter 27 indicates this difference in driving voltage. The dial on meter 27 may be calibrated in percent change from center position.

Before the surgical operation commences, the patient's blood presure may be observed using conventional means. The meter 27 is then centered by means of potentiometer 25. Potentiometer 26 is provided for zeroing the meter 27 with no signal applied so that it will deflect equally on either side of center position. Thereafter, during the operation, increases or decreases in blood pressure are indicated by the movement of the indicator from center position. An absolute indication of blood pressure is available by noting the original blood pressure reading and observing the percent change from center position. The meter dial may also be calibrated directly with a blood pressure scale for the patient.

*Pulse forming circuit*

The electrical signal developed in the pick-up apparatus (10, Fig. 1) by the patient's pulse beats is applied to a multivibrator 30. The function of this multivibrator is to develop a sharp pulse from the relatively slow rising pulse obtained from the pick-up apparatus. This pulse will be used to actuate the pulse rhythm indicator 15 (Fig. 1) and the counter circuits 14 (Fig. 1). In the pulse forming circuit 12 (Fig. 1) a monostable multivibrator 30 is preferably used since it will form one sharp voltage pulse of short duration for each triggering pulse, and return quickly to its initial position after the trigger pulse is removed. The amplitude of triggering potential needed to trigger may be set at a predetermined minimum value so that random noise signals will not produce voltage pulses. An operational duration of the multivibrator output pulse may be one millisecond.

*Pulse rhythm indicator*

The output pulse is connected through a coupling capacitor and across the input resistor 32 of an amplifier stage 33. An amplified pulse is obtained across the plate resistor 34 of the amplifier stage 33. This amplified pulse is used to trigger the binary pulse counter 14 (Fig. 1).

Another purpose of this amplifier stage 33 is to provide a triggering signal for the pulse rhythm indicator 15 (Fig. 1) which is a neon lamp 37 in this illustrative embodiment of the invention. The triggering signal for the lamp 37 is taken across an unbypassed cathode resistor 35.

This triggering signal corresponds to only one pulse beat, but positive and negative portions obtained by differentiating through capacitor 36 would cause the neon lamp 37 to flash twice. Consequently, it is desirable to remove either the positive or the negative portions of this triggering. This is done by means of a clamping diode 38. Therefore, as shown, the positive pulse of the trigger signal will cause the neon lamp 37 to flash. The other pulse will be shunted through the rectifier 38. Flashing of the lamp occurs at every pulse beat. The rhythm of the pulse beats is indicated by noticing the rate at which the lamp flashes.

*Pulse counter*

The pulse counter 14 (Fig. 1) comprises six bistable circuits of the Ecceles-Jordon type connected in tandem. A substantially similar bistable circuit is described in "Electronic Circuits and Tubes" by the Cruft Laboratory Staff in chapter 24, section 27. The leading bistable sage 39 is shown in detail in Fig. 2. It is triggered by the amplified pulse obtained from the monostable multivibrator 30. Triggering is accomplished in a manner similar to the triggering and ignition of the neon lamp 37 because only one triggering pulse should be counted for each beat of the patient's heart. Consequently, a coupling capacitor 40 and a rectifier 41 connected from the output of the coupling capacitor 40 to ground is used. The combination allows only single polarity pulses to be applied to the binary circuit. In the method proposed in this illustrative embodiment of this invention for triggering the bistable circuits, a positive trigger pulse is applied. Therefore, the orientation of the rectifier 41 is to shunt negative signals to ground. The other bistable circuits included in the counter 42, 43, 44 45 and 46 and the leading bistable circuit 39 are connected in tandem. The output signal of the leading bistable stage 39, thus, triggers the following stage 42. The remaining stages 43, 44, 45, and 46 will be successively triggered since they are similarly interconnected. The state of conduction of the tubes in each bistable stage 39, 42, 43, 44, 45 and 46 is indicative of the number of trigger pulses which have been received. An output connection, A, B, C, D, E, and F is made to the tubes 48 on the right side of each bistable stage, and fed into the pulse count display matrix 13 (Fig. 1) where the combination of "on" and "off" tubes dictates the pulse count that is displayed.

*Timing pulse generator*

The patient's pulse must be taken over a time interval. It is medical practice to call the number of pulse beats per minute, the "pulse." Therefore, the bistable circuits 39, 42, 43, 44, 45 and 46 in the pulse counter must be reset after a predetermined interval. Upon medical recommendation, the counter is reset after the number of pulses received for a fifteen second interval are registered. A timing pulse generator 17 (Fig. 1) continuously generates pulses separated by predetermined intervals of fifteen seconds. This generator may be a free running unsymmetrical multivibrator 49 which is plate-to-grid coupled. The predetermined fifteen second interval and a "dead" or recovery time of one to two seconds may be acurately set by adjusting the time constants associated with the grid circuits of the tubes in the multivibrator 49. It is desirable to delay the generation of the timing pulse if a pulse beat is arriving simultaneously therewith. In order to accomplish this delay, the amplified voltage pulse from the monostable multivibrator 30 may be applied to the timing multivibrator 49. Pulse beats arriving before the generation of the timing pulse do not disturb the operation of the timing multivibrator 49. However, those pulse beats arriving during the "flip-over" which occurs when the states of conduction in the tubes of the multivibrator 49 are reversed provide sufficient negative bias on the grids of the nonconducting tube to delay conduction therein until the pulse beat disappears. Consequently, the generation of the timing pulse will be delayed during the one-millisecond trigger pulse duration. A method of introducing these voltage pulse beats into the timing multivibrator 49 is to connect the plate output of the amplifier stage 33 driven by the monostable, voltage pulse forming multivibrator 30 to the cathodes of the tubes in the timing multivibrator 49.

*Counter reset circuit*

The timing pulse generated by the timing multivibrator 49 is applied to trigger the normally nonconducting tube 50 of a cathode coupled multivibrator 51. The nonconducting tube 50 is thereby made to conduct, and the normally conducting tube 52 is cut off.

The coil 53 of a relay 54 is connected from the plate of the normally conducting tube 52 to ground. When the tube 52 conducts, a low resistance path exists from the B+ supply source, (not shown) through the plate resistor 55, and the tube 52. Consequently, there is not enough current passing through the relay coil 53 to energize the relay 54. Upon cut off, however, the tube 52 presents a high resistance so that the relay 54 is energized. The time constant associated with the grid of the normally conducting tube is of the order of one to two milliseconds. The normally conducting tube 52 is, therefore, cut off for a very small part of the fifteen second predetermined interval during which the pulses are counted, and the time lost in resetting the counter is insignificant. The relay contactors 56 are normally closed, and provide contact between the cathodes 57 of each tube 48 on the right side of each bistable circuit stage 39, 42, 43, 44, 45 and 46 and ground. The initial or zero count state of the counter is with each tube 48 on the right hand side of each bistable circuit stage nonconducting. Operation of the relay 54 momentarily opens the contactors 56. This momenarily opens the circuit of the tubes 57, thus resetting the counter in its initial state.

*Pulse count display matrix*

Fig. 3 shows the pulse count display matrix in detail. Input information from each bistable stage 39, 42, 43, 44, 45 and 46 of the binary counter is connected to the display matrix at six points A, B, C, D, E and F. A ganged group of contactors 58, connects the input information to a relay bank 59 of six relays 60. This ganged group of contactors 58 are actuated by a relay coil 64, and form a portion of a reset relay. The function of this portion of the reset relay is to sample the number of pulse beats received by the binary counter during the predetermined, fifteen second interval.

The timing pulse from the timing multivibrator 49 (Fig. 2) is differentiated by means of a capacitor 61 and a resistor 62, and applied to a normally cut off cathode follower stage 63 having the reset relay coil 64 connected in its cathode circuit. The timing pulse causes the cathode follower 63 to conduct. The magnetic action of the relay coil 64 causes movable and fixed contacts of the reset relay 65 and 66 respectively to close so that a connection is made from each bistable stage to each relay 60 in the relay bank 59.

The relays 60 in the relay bank 59 have relay coils 67. One end of the relay coil 67 is connected to the fixed contact 66 of the reset relay, and the other end is connected to a source of relatively high B+ potential (not shown). Each relay coil in the relay bank 59 has a plurality of fixed and movable, ganged contact sets associated with it.

One set of contacts 68, shown closest to the relay coils 67 is incorporated in a circuit that "locks-in" the count after sampling. Of the other sets of contacts, one column of contacts 69 is shown in detail. A partial development of the remaining contacts is shown which illustrates the principle and mode of operation of the lamp display. Aside from the "lock-in" contacts set 68, there are thirty-two sets of contacts actuated by the bottom relay 60 in the relay bank 59. Sixteen ganged sets associated with the relay 60, above it; eight ganged sets with the relay 60 above; four with the next relay 60 above; two with the next; and one contact shown in column 69 with the uppermost relay 60 of the relay bank 59.

In wiring the sets of contacts associated with the lamp display, the movable contact 70 of the contact set actuated by the uppermost relay coil 67 in the relay bank 59 is connected to a source of relatively high B+ potential (not shown). This movable contact 70 normally rests upon and makes contact with a fixed contact 71 which is part of the contact set. This fixed contact 71 is connected to a movable contact 72 actuated by the relay coil 67 which is positioned below the uppermost relay. This movable contact 72 normally makes contact with a similar fixed contact as described before. Identical connections are made among the four remaining sets of contacts in the column 69. The fixed contact 74 actuated by the bottom relay coil 67 in the relay bank 59 is connected to one end of a relay coil 75. The other end of this coil 75 is grounded. This relay coil 75 forms a relay assembly with a set of three ganged movable contacts 76 which are connected to a source of potential B+ (not shown). Three fixed contacts 77 are associated with these ganged movable contacts 76, and are connected to certain lamps in the display matrix. Relay assemblies 79, 80, and 81 identical with the relay assembly 78 that are associated with the sets of contacts in the last mentioned column 69 are connected to normally open fixed contacts 82 and 83 in the illustrated column 69 of contacts and to another set of contacts 84 actuated by relay 60 positioned above the bottommost relay in the relay bank 59. A complete circuit may be made through these sets of contacts which will light certain other lamps on the display matrix. In a similar manner all lamps may be lighted in groups of three. The lamps are arranged in columns of hundreds, tens, and digits. Therefore, three lamps must glow to give the number of pulses counted.

During the sampling operation, a current may flow from the B+ source (not shown), through the relay coils 67 of each relay in the relay bank 59, and return to either the B+ source or through the tubes 48 on the right side of the bistable stages (shown in Fig. 2) and to ground. If a tube 48 is in a normal nonconducting state, no current can flow through the relay coils 67 because the return path is made to the B+ supply. However, if the tube 48 is conducting, current can flow and the relays 60 which are connected to conducting tubes 48 will be energized; thus, altering the position of the contacts that are operated by these relays 60.

In Fig. 3, no trigger pulses have been received. A complete connection is made through the illustrated column of contacts 69. The actuation of the display relay 78 will cause "zero" lamps in all three rows to be lit. If the tube 48 in the first bistable stage is made to conduct by one trigger pulse beat, contact to the fixed contact 74 associated with the bottommost relay 60 is broken, and contact is made with the other fixed contact 83. The next display relay 79 will be energized causing the "four" lamp to glow in the digits column of the display matrix, and zero lamp to remain on in the other columns. Actuation of the other relay shown causes the twelve lamp to glow. It may be observed, that the lamps indicate the pulse count in the multiples of four. This is because the counter is reset every fifteen seconds and the desired display is in pulse beats per minute.

It is necessary, to put out the lamps after fifteen second intervals, and to "lock-in" the count after sampling so that it may be displayed for the intervals between samplings. Means for accomplishing this result employ the sets of contacts 78 which are associated with every relay 60 in the relay bank 59. The reset relay 64 is also employed. The movable contact of contacts 68 is connected to ground through a resistor 85 and a normally closed grounding contact 86. This grounding contact 86 is operated by the coil of the reset relay 64 at the same time as contact 65 connects the relay bank to the bistable stage. However, this grounding contact 86 is constructed to open and close more rapidly. Energization of a relay coil 67 in the relay bank 59 causes the set of "lock-in" contacts 68 associated with that relay to close, and establishes a current path from the high potential B+ supply (not shown) to ground which "locks-in" the relay 60 involved. Reset of the lamp matrix at initial zero count display at the next timing pulse is accomplished when the reset relay momentarily opens the grounding contact 86.

What is claimed is:

1. Apparatus for obtaining systolic information comprising means for deriving an electrical signal varying in intensity according to the intensity of the systolic pulsating action of the heart, a difference amplifier, means including said difference amplifier driven by said electrical signal for obtaining an indication of blood pressure caused by said pulsating action of the heart, means responsive to said electrical signal for deriving a pulse of voltage in the event that the intensity of said electric signal is greater than a predetermined level of intensity, an electrical pulse counting circuit connected to count said voltage pulses derived from said electrical signal responsive means, means for displaying said pulse count, means for generating a timing pulse of electricity at predetermined intervals, means responsive to said timing pulse generated by said timing pulse generating means for resetting said pulse counting circuit, and means actuated by said timing pulse generated by said timing pulse generating means for resetting said pulse count to be displayed on said displaying means for said predetermined interval.

2. Apparatus for obtaining systolic information comprising means for deriving an electrical signal varying in intensity according to the intensity of the systolic pulsating action of the heart, a difference amplifier, means driven by said electrical signal including said difference amplifier for obtaining an indication of blood pressure caused by said pulsating action of the heart, means responsive to said electrical signal for deriving a pulse of voltage in the event that the intensity of said electric signal is greater than a predetermined level of intensity, an amplifier, said pulse signal coupled to said amplifier, means including said amplifier for manifesting the rhythm of said pulsating action of the heart, an electrical pulse counting circuit connected to count said voltage pulses derived from said electrical signal responsive means, means for displaying said pulse count, means for generating a timing pulse of electricity at predetermined intervals, means responsive to said timing pulse generated by said last named generating means for resetting said pulse counting circuit, and means actuated by said timing pulse for causing said pulse count to be displayed on said displaying means for said predetermined interval.

3. Apparatus for obtaining systolic information comprising pick-up means for deriving and amplifying an electrical signal varying in amplitude according to the intensity of the systolic pulsating action of the heart, a difference amplifier having at least two stages of amplification and an indicating device in the output thereof, means for rectifying said electrical signal thereby producing a rectified electric signal, at least one stage of said difference amplifier being driven by said rectified signal for obtaining an indication of blood pressure caused by said pulsating action of the heart on said indicating device, a monostable multivibrator driven by said electrical signal for deriving a pulse of voltage in the event that the amplitude of said electric signal is greater than a predetermined level of amplitude, a second amplifier, said pulse signal coupled to said second amplifier, means including said second amplifier for manifesting the rhythm of said pulsating action of the heart, a binary counter triggered by said voltage pulse connected to count the number of said voltage pulses derived from said electric signal responsive means over a predetermined interval, a pulse count display matrix for displaying said pulse count, an astable multivibrator for generating a timing pulse of electricity at predetermined intervals, relay means responsive to said timing pulse generated by said astable multivibrator for resetting said binary counter after said predetermined interval, and further relay means actuated by said timing pulse for causing said pulse count to be displayed on said displaying means over said predetermined interval.

4. In an apparatus for obtaining systolic information having means for deriving an electrical signal varying in amplitude according to the systolic pulsating action of the heart, an electronic comparator circuit for indicating blood pressure comprising a rectifying detector arranged to receive said electrical signal and in turn to produce a signal varying in accordance with the peak amplitude of said electrical signal, a difference amplifier driven by the detected signal from said rectifying detector and providing an output signal indicating the difference between the amplitude of said detected signal and a reference level of potential, and an indicating device connected to receive said output signal from said difference amplifier, said blood pressure being indicated on said indicating device.

5. In an apparatus for obtaining systolic information having means for deriving an electrical signal varying in amplitude according to the systolic pulsating action of the heart, the combination which comprises a rectifying detector circuit having input and output connections, said detector circuit being connected to detect the peaks of said elecrical signal, said detected signal appearing in the output thereof, a difference amplifier having at least two amplifier tubes, each tube having at least a cathode, an anode, and a control grid, said control grid of one of said tubes in said difference amplifier connected to said output connection of said rectifying detector, a control grid of said other tube being connected to a point of reference potential, a two terminal indicating device, one terminal of said indicating device connected in the plate circuit of one of said tubes, and the other terminal of said indicating device connected in the plate circuit of the other of said tubes whereby said indicating device is capable of indicating the blood pressure corresponding to the intensity of said systolic pulsating action with reference to a reference level of intensity.

6. The combination according to claim 5 including potentiometer voltage adjusting means connected in said plate circiuts and in said control grid connections for adjusting the indication of said indicating device.

7. In an apparatus for obtaining systolic information having means for deriving an electrical signal varying in amplitude according to the systolic pulsating action of the heart, a pulse counting apparatus for counting each pulsation of the heart comprising means responsive to said electrical signal for providing a pulse of voltage upon each occurrence of said electrical signal having an amplitude which is greater than a predetermined level of amplitude, an electrical pulse counting circuit connected to count said pulses of voltage, means for displaying said pulse count, means for generating a gating pulse of electricity at predetermined intervals, means responsive to said gating pulse for resetting said pulse counting circuit after said predetermined interval, and means actuated by said gating pulse for causing said pulse count to be displayed for said predetermined interval.

8. In an apparatus for obtaining systolic information having means for deriving an electrical signal varying in amplitude according to the systolic pulsating action of the heart, a pulse counting apparatus for counting each pulsation of the heart comprising means responsive to said electrical signal for providing a pulse of voltage in the event that the amplitude of said electrical signal is greater than a predetermined level of amplitude, a binary counter containing at least six bistable circuits, having two tubes in each of said bistable circuits, said bistable circuits being connected in tandem and triggered by said pulse of voltage from said electrical signal responsive means to provide a count of said voltage pulses, means including a matrix of indicator lamps for displaying said count connected to each of said bistable circuits, a pulse generator providing a timed train of pulses, said pulses being generated at predetermined intervals, and means actuated by said train of pulses including at least one tube of each of said bistable circuits for resetting said counter in a zero count position after said predetermined interval.

9. In an apparatus for obtaining systolic information having pick-up means for deriving an electrical signal varying in amplitude according to the systolic pulsating action of the heart, a pulse counting apparatus for counting each pulsation of the heart comprising a monostable multivibrator triggered by said electrical signal for providing a pulse of voltage in the event that the amplitude of said electrical signal is greater than a predetermined level of amplitude, a leading bistable circuit, said leading bistable circuit having two vacuum tubes, each of said tubes having a cathode, a plate and a control grid, a plurality of identical bistable circuits connected in tandem with said leading bistable circuit, means for triggering said leading bistable circuit with said pulses of voltage thereby altering the state of conduction of said tubes in each of said bistable circuits according to the number of said pulses of voltage, means responsive to the state of conduction of said tubes in each of said bistable circuits and connected to each of said circuits whereby the number of pulses are displayed, a pulse generator providing a gating pulse at intervals, a relay having a pair of contacts in a normally closed position, one of said contacts being connected to a fixed level of potential and the other to said cathode element of corresponding tubes in each of said bistable circuits, and means for timed actuation of said relay by said gating pulse so that said pair of contacts open and said bistable circuits are reset at predetermined intervals.

10. Pulse counting apparatus according to claim 9 having a matrix of indicator lamps and wherein the means responsive to the state of conduction of said tube is a plurality of relays in a bank of relays having contacts connected to actuate said matrix of indicator lamps, a reset relay, contacts of said reset relay connecting said bistable circuits to said plurality of relays in said relay bank, means actuated by said recurrent voltage pulse for energizing said reset relay and closing said contacts thereof thereby connecting said bistable circuits to said relays of said relay bank, further contacts of said reset relay adjusted to open and close more rapidly than said other contacts of said reset relay, a source of electric current, a pair of contacts of each of said relays of said relay bank connecting said current source to said relays of said relay bank through said further contacts of said reset relay whereby said relays of said relay bank are locked-in and remain energized on the closing of said plurality of contacts of said reset relay and become de-energized on opening of said further contacts of said reset relay.

References Cited in the file of this patent

UNITED STATES PATENTS 2,249,370    Williams  _____ July 15, 1941